United States Patent
Khan et al.

(10) Patent No.: US 12,442,282 B1
(45) Date of Patent: Oct. 14, 2025

(54) METHODS AND COMPOSITIONS FOR THERMALLY SHOCKING SUBSURFACE FORMATIONS

(71) Applicants: King Fahd University of Petroleum and Minerals, Dhahran (SA); Saudi Arabian Oil Company, Dhahran (SA)

(72) Inventors: Fahad Khan, Dhahran (SA); Mohamed Ahmed Nasr Aldeen Mahmoud, Dhahran (SA); Arshad Raza, Dhahran (SA); Murtadha J. AlTammar, Dhahran (SA); Shirish Patil, Dhahran (SA)

(73) Assignees: Saudi Arabian Oil Company, Dhahran (SA); King Fahd University of Petroleum & Minerals, Dhahran (SA)

( * ) Notice: Subject to any disclaimer, the term of this patent is extended or adjusted under 35 U.S.C. 154(b) by 0 days.

(21) Appl. No.: 18/738,472

(22) Filed: Jun. 10, 2024

(51) Int. Cl.
| | |
|---|---|
| *E21B 43/267* | (2006.01) |
| *C09K 8/66* | (2006.01) |
| *C09K 8/70* | (2006.01) |
| *E21B 33/12* | (2006.01) |

(52) U.S. Cl.
CPC .......... *E21B 43/267* (2013.01); *C09K 8/665* (2013.01); *C09K 8/70* (2013.01); *E21B 33/12* (2013.01)

(58) Field of Classification Search
CPC ...................................................... E21B 43/26
See application file for complete search history.

(56) References Cited

U.S. PATENT DOCUMENTS

| | | | |
|---|---|---|---|
| 9,920,608 B2 | 3/2018 | van Oort et al. | |
| 11,339,319 B2 | 5/2022 | Al-Nakhli et al. | |
| 11,454,098 B2 | 9/2022 | Al-Nakhli et al. | |
| 2005/0167104 A1* | 8/2005 | Roddy .................. | C09K 8/473 166/279 |
| 2015/0047846 A1* | 2/2015 | van Oort ............... | E21B 43/164 166/302 |

OTHER PUBLICATIONS

Enayatpour et al., "FreezeFrac Improves the Productivity of Gas Shales", Society of Petroleum Engineers, SPE166482, Sep. 30-Oct. 2, 2013.

* cited by examiner

*Primary Examiner* — William D Hutton, Jr.
*Assistant Examiner* — Avi T Skaist
(74) *Attorney, Agent, or Firm* — DINSMORE & SHOHL LLP

(57) ABSTRACT

A method of thermally shocking a subsurface formation may comprise introducing an endothermic fluid composition into a wellbore fluidly connected to the subsurface formation, the endothermic fluid composition comprising an aqueous solution, ammonium chloride, and sodium hydroxide; reacting the ammonium chloride and sodium hydroxide, thereby decreasing a temperature of the endothermic fluid and producing ammonia; and exposing the reacted endothermic fluid composition to the subsurface formation, thereby thermally shocking at least a portion of the subsurface formation and inducing one or more fractures in the same.

15 Claims, 6 Drawing Sheets

Before Treatment  After Treatment

Before Treatment  After Treatment

METHODS AND COMPOSITIONS FOR THERMALLY SHOCKING SUBSURFACE FORMATIONS

FIELD

The present disclosure generally relates to methods, compositions, and systems for producing fluids from subsurface formations. More particularly, embodiments herein relate to methods and compositions for thermally shocking a subsurface formation, as well as systems and methods for recovering ammonia therefrom, as detailed herein.

BACKGROUND

Unconventional reservoir rocks are typically characterized by very low permeability and porosity. To make cost-effective production from these reservoirs, unconventional means such as horizontal drilling and hydraulic fracturing are typically practiced. In hydraulic fracturing, also referred to as 'fracking', a fluid is pumped at high pressure into the subsurface formation, generating one or more elongated fractures in the subsurface formation that may be propped open by a subsequently placed proppant. These propped open fractures form a higher permeability conduit within the formation, enabling increasing recovery of fluids from the same.

However, during hydraulic fracturing, the formation breakdown pressure (pressure at which the first fractures begin to form) is of great importance and depends on geomechanical characteristics (strength and Poisson's ratio). As previously mentioned, typically great pressures and large amounts of injected fluid are needed to achieve initial formation breakdown, adding substantial cost and material needs to the process.

SUMMARY

Thus, continuously desired are alternative or supplemental methods to reduce the amount of fluid and/or pressure need to fracture subsurface formations. Embodiments herein fulfill the aforementioned need by providing compositions and methods for inducing thermal shock in the subsurface formation, which is often are present at elevated temperatures, thereby softening and/or forming one or more fractures in the same. The resultant softening and/or one or more fractures may operate to decrease a compressive strength and Poisson's ratio of the subsurface formation, thereby also decreasing the formation breakdown pressure. The net result is that subsequent hydraulic fracturing operations may need to use less fluid and less pressure to adequately fracture the subsurface formation, thereby resulting in considerable cost and materials saving.

Particularly, in one more embodiments herein, an endothermic fluid composition is provided that may rapidly decrease in temperature when reacted, also forming ammonia. When exposed to a subsurface formation, the reacted endothermic fluid may reduce the temperature of the same, inducing thermal shock in the subsurface formation. Furthermore, to recycle and/or further utilize the ammonia produced from the reacted endothermic fluid, methods and systems are provided for recovery of the ammonia from the subsurface formation. Particularly, ammonia gas may be recovered from the backside of the wellbore, i.e., the wellbore annulus, wherein the ammonia gas may be recycled back into ammonium chloride for re-use or converted into hydrogen gas as a fuel source.

In accordance with one embodiment of the present disclosure, a method of thermally shocking a subsurface formation may comprise introducing an endothermic fluid composition into a wellbore fluidly connected to the subsurface formation, the endothermic fluid composition comprising an aqueous solution, ammonium chloride, and sodium hydroxide; reacting the ammonium chloride and sodium hydroxide, thereby decreasing a temperature of the endothermic fluid and producing ammonia; and exposing the reacted endothermic fluid composition to the subsurface formation, thereby thermally shocking at least a portion of the subsurface formation and inducing one or more fractures in the same.

In accordance with another embodiment of the present disclosure, an endothermic fluid composition may comprise an aqueous solution; ammonium chloride; and sodium hydroxide.

BRIEF DESCRIPTION OF THE DRAWINGS

The following detailed description of specific embodiments of the present disclosure can be best understood when read in conjunction with the following drawings, where like structure is indicated with like reference numerals and in which.

Figure (FIG. 1 illustrates a system for thermally shocking a subsurface formation and/or recovering ammonia gas from a subsurface formation, according to embodiments herein.

Figure 1:
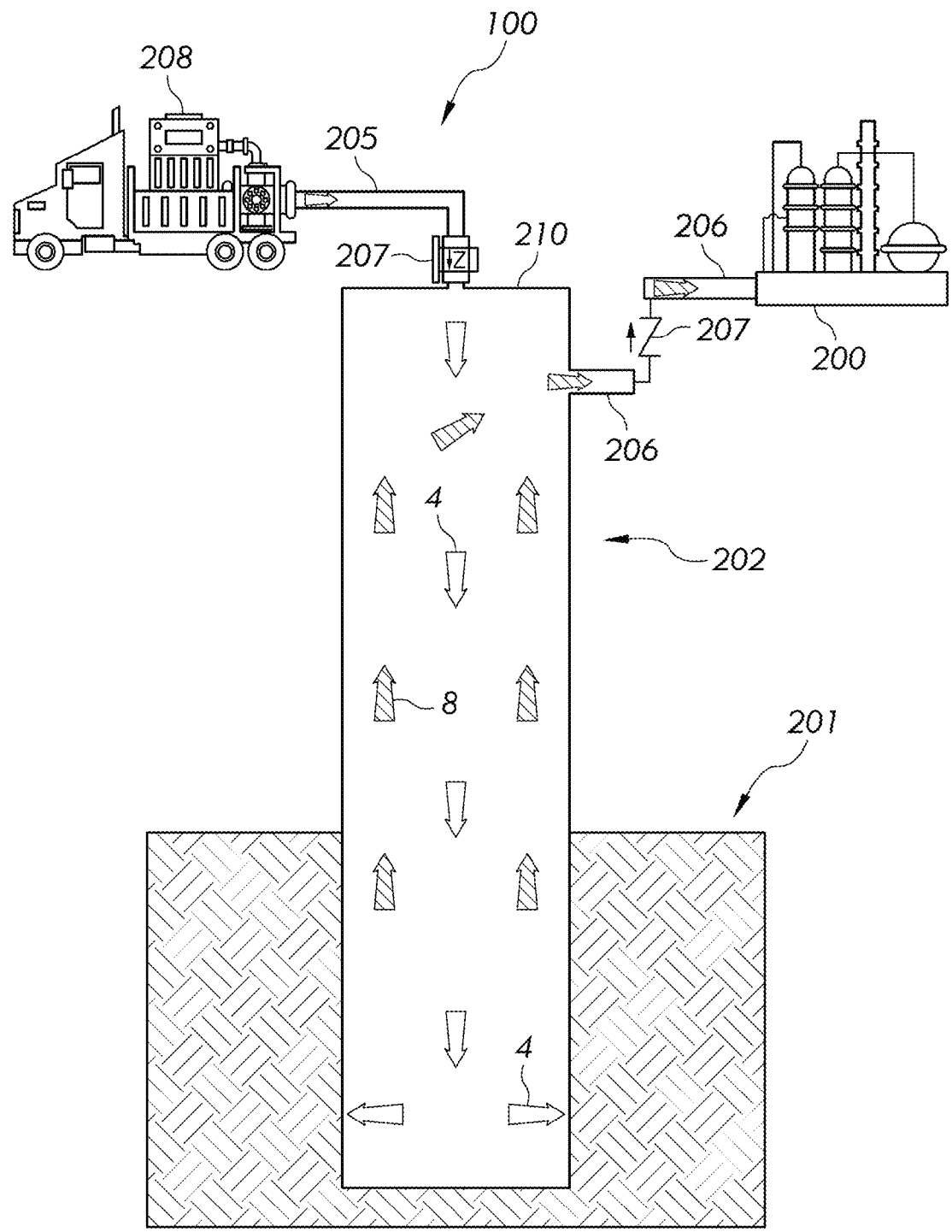

For the purpose of describing the simplified schematic illustrations and descriptions of the relevant figures, the numerous valves, temperature sensors, electronic controllers and the like that may be employed and well known to those of ordinary skill in the art of certain chemical processing operations and or hydraulic fracturing operations are not included. It should be understood that these components are within the spirit and scope of the present embodiments disclosed. However, operational components, such as those described in the present disclosure, may be added to the embodiments described in this disclosure.

Reference will now be made in greater detail to various embodiments, some embodiments of which are illustrated in the accompanying drawings. Whenever possible, the same reference numerals will be used throughout the drawings to refer to the same or similar parts.

DETAILED DESCRIPTION

As previously stated, embodiments described herein generally relate to methods, compositions, and systems for producing fluids from subsurface formations. More particularly, embodiments herein relate to methods and compositions for thermally shocking a subsurface formation, as well as systems and methods for recovering ammonia therefrom, as detailed herein.

As used throughout this disclosure, the terms "downhole" and "uphole" may refer to a position within a wellbore relative to the surface, with uphole indicating direction or position closer to the surface and downhole referring to direction or position farther away from the surface.

As described in the present disclosure, a "subsurface formation" may refer to a body of rock that is sufficiently distinctive and continuous from the surrounding rock bodies that the body of the rock may be mapped as a distinct entity. A subsurface formation is, therefore, sufficiently homogenous to form a single identifiable unit containing similar properties throughout the subsurface formation, including, but not limited to, porosity and permeability.

As used throughout this disclosure, "thermal shock" may refer to a process a material undergoes upon experiencing an abrupt heat flux or temperature gradient change. Upon experiencing the same, the material undergoes significant thermal stress and strain, often causing material failure. The material failure may be observed in terms of cracks or loss of compressive or tensile strength in the material.

As used throughout this disclosure, "wellbore," may refer to a drilled hole or borehole extending from the surface of the Earth down to the subsurface formation, including the openhole or uncased portion. The wellbore may form a pathway capable of permitting fluids to traverse between the surface and the subsurface formation. The wellbore may include at least a portion of a fluid conduit that links the interior of the wellbore to the surface. The fluid conduit connecting the interior of the wellbore to the surface may be capable of permitting regulated fluid flow from the interior of the wellbore to the surface and may permit access between equipment on the surface and the interior of the wellbore.

As used throughout this disclosure, a "wellbore wall" may refer to the interface through which fluid may transition between the subsurface formation and the interior of the wellbore. The wellbore wall may be unlined (that is, bare rock or formation) to permit such interaction with the subsurface formation or lined, such as by a tubular string, so as to prevent such interactions. The wellbore wall may also define the void volume of the wellbore.

Referring initially to FIG. 1, illustrated is a system 100 for thermally shocking a subsurface formation 201 and/or for recovering ammonia 8 from the same, such as by utilizing an endothermic fluid composition 4. In one or more embodiments herein, the endothermic fluid composition 4 may comprise an aqueous solution and one or more components operable to form ammonia 8 when reacted. For example, and in embodiments, the endothermic fluid composition 4 may comprise the aqueous solution, ammonium chloride and a hydroxide-containing compound, such as barium hydroxide or sodium hydroxide.

In such embodiments including the ammonium chloride, the aqueous solution, and the barium hydroxide, the endothermic reaction may proceed according to Equations I and II below, wherein the ammonium chloride reacts primarily with the barium hydroxide but also to a lesser extent with the aqueous solution:

$$NH_4Cl(s)+H_2O(l) \rightarrow NH_4^+(aq)+Cl^-+H_2O(l) \rightarrow NH_4OH+HCl(l) \quad \text{(I); and}$$

$$NH_4Cl(s)+BaOH(aq) \rightarrow NH_3^+(g)+BaCl(aq)+H_2O(l) \quad \text{(II)}$$

In such embodiments including the ammonium chloride, the aqueous solution, and the sodium hydroxide, the endothermic reaction may proceed according to Equations I and III below, wherein the ammonium chloride reacts primarily with the sodium hydroxide but also to a lesser extent with the aqueous solution:

$$NH_4Cl(s)+NaOH(aq) \rightarrow NH_3^+(g)+NaCl(aq)+H_2O(l) \quad \text{(III).}$$

As shown in the examples hereinbelow, the reaction between ammonium chloride and water may generally be less endothermic than reactions between ammonium chloride and hydroxide containing compounds, such that it may be desired to optimize the endothermic fluid composition 4 towards the ammonium chloride and hydroxide containing compound reaction. Moreover, it may be desired to optimize the endothermic fluid composition 4 towards the ammonium chloride and hydroxide containing compound reaction to enable the recovery of ammonia 8 from the subsurface formation 201, first as a dissolved solution, and later as a freed gas, as explained in further detail below. Particularly, it is contemplated that while the ammonium chloride and water reaction may also generate ammonia gas, such generation may amount to a minor portion of the total product, as opposed to a major portion of the total product in the ammonium chloride and hydroxide containing compound reaction.

Further, sodium hydroxide may be preferable to barium hydroxide, and in particular barium hydroxide octahydrate, due at least to barium hydroxide's relatively low solubility in the aqueous solution as compared to sodium hydroxide. Particularly, it is contemplated that endothermic fluid compositions comprising the barium hydroxide may not completely dissolve without the provision of a greater ratio of water. However, the provision of a greater ratio of water may also bias the endothermic fluid composition 4 towards the relatively less endothermic water and ammonium chloride reactions as compared to sodium hydroxide and ammonium chloride.

Accordingly, to bias the endothermic fluid composition 4 towards reactions between the sodium hydroxide and ammonium chloride, a molar ratio between the sodium hydroxide and the ammonium chloride may be from 1:1 to 15:1 sodium hydroxide to ammonium chloride, such as from 1:1 to 2:1, from 2:1 to 5:1, from 5:1 to 10:1, from 10:1 to 12:1, from 12:1 to 15:1, or any combination of the previous ranges or smaller range therein, such as from 2:1 to 12:1 sodium hydroxide to ammonium chloride.

Further, a concentration of the ammonium chloride in the aqueous solution, i.e., in the endothermic fluid, may be from 0.1 Molar to 5 Molar, such as from 0.1 Molar to 0.4 Molar, from 0.4 Molar to 0.5 Molar, from 0.5 Molar to 0.6 Molar, from 0.6 Molar to 1 Molar, from 1 Molar to 5 Molar, or any combination of the previous ranges or smaller range therein, such as from 0.4 Molar to 0.6 Molar. Further yet, a concentration of the sodium hydroxide in the aqueous solution, i.e. in the endothermic fluid, may be from 0.1 Molar to 32 Molar, such as from 0.1 Molar to 0.5 Molar, from 0.5 Molar to 1 Molar, from 1 Molar to 2 Molar, from 2 Molar to 6 Molar, from 6 Molar to 10 Molar, from 10 Molar to 16 Molar, from 16 Molar to 32 Molar, or any combination of the previous ranges or smaller range therein, such as from 1 Molar to 6 Molar.

As previously stated, the endothermic fluid composition 4 may comprise an aqueous solution. The aqueous solution may comprise distilled water, deionized water, or tap water. In embodiments, the aqueous solution may additionally comprise additives or contaminants. For example, the aqueous solution may comprise freshwater, seawater, natural brine, synthetic brine, formation water, salt water, or combinations thereof.

Now referring back to FIG. 1, the system 100 may comprise a subsurface formation 201, a wellbore 202, a tubing string 204, and a wellhead 210. Moreover, while the wellbore 202 and the subsurface formation 201 are shown to be vertical, the wellbore 202 in at least some embodiments may at least partially horizontal, i.e., the wellbore 202 may be part of a horizontally drilled well, as may be understood in the art. The subsurface formation 201 may comprise an unconventional reservoir, such as a shale.

As shown in FIG. 1, the wellbore 202 may be fluidly connected to the subsurface formation 201, such as by the wellbore wall. The wellbore 202 may also be fluidly connected to the wellhead 210 positioned at the surface, such as through the tubing string 204, which may be positioned within the wellbore 202. For example, and in one or more embodiments, the tubing string 204 may provide a fluid conduit from the surface to a termination point in the wellbore 202 proximal the subsurface formation 201, such that fluid injected into the tubing string 204 is primarily exposed to the subsurface formation 201. The tubing string 204 may be provided at least temporarily in the wellbore 202 by utilizing coiled tubing, although this is not required.

Moreover, in the event the wellbore 202 comprises a tubing string 204, the wellbore 202 may also be fluidly connected to the wellhead 210 at the surface through a wellbore annulus. For example, and in embodiments, an exterior of the tubing string 204 and the wellbore 202 may together define the wellbore annulus. In at least some embodiments, the tubing string 204 may comprise a packer assembly 203 positioned on the exterior of the tubing string 204, the packer assembly 203 configured to form a seal against the wellbore 202 when actuated. In so being configured, the packer assembly 203, when actuated, may operate to isolate the wellbore annulus from the surface of the wellbore 202 to the packer assembly 203.

As previously stated, the systems herein may be utilized to thermally shock the subsurface formation 201, such as introducing the endothermic fluid composition 4 to the subsurface formation 201. As previously stated, the ammonium chloride may spontaneously react with both the sodium hydroxide and water to form ammonia gas in an endothermic reaction.

Further, it is contemplated that the wellbore 202, by being in fluid and thermal communication with the subsurface formation 201 and surrounding formations along the length of the wellbore 202, may be at a resting temperature relatively greater than the endothermic fluid composition 4 after reacting. Accordingly, to concentrate as much of the thermal shock as possible to the subsurface formation 201, it may be desired to segregate the ammonium chloride and sodium hydroxide until they approach the subsurface formation 201. Accordingly, in at least one embodiment, the ammonium chloride may be coated, such that reaction with the sodium hydroxide and the aqueous solution is delayed. Further, the coating may be temperature sensitive, such that the coating may at least partially dissipate upon thermal communication with the subsurface formation 201.

Alternatively, in such embodiments comprising the tubing string 204, the inclusion of the tubing string 204 in the system 100 may permit the segregation of the ammonium chloride and sodium hydroxide (or any other hydroxide-containing compound) of the endothermic fluid until the endothermic fluid composition 4 approaches or reaches the subsurface formation 201. It is contemplated that this may be of substantial benefit in not requiring that one or both of the reactive components be coated prior to introduction into the wellbore 202. The tubing string 204 may also permit the recycling of the generated ammonia 8 up the wellbore annulus or the tubing to regenerate into ammonium chloride for reintroduction into the same or different wellbores, as explained in further detail herein.

Alternatively or additionally, in at least some embodiments, the system 100 may comprise multiple tubing strings. For example, the aforementioned tubing string 204 may be a first tubing string 204, with the system 100 additionally comprising a second tubing string 204. The second tubing string 204 may be similar or identical to the first tubing string 204, which may be fluidly connected to the surface by the wellhead 210 and may extend to a second termination point in the wellbore 202 proximal the subsurface formation 201, such as closer to, farther from, or identical from the subsurface formation 201 than the first tubing string 204. In embodiments, the second tubing string 204 may be concentrically disposed inside the first tubing string 204. For example, and in embodiments, the first tubing string 204 may suspended in the wellbore 202 via a tubing hanger in the wellhead 210, whereas the second tubing string 204 may be concentrically disposed in the first tubing string 204 such as via coiled tubing. Similar to the single tubing string 204, the inclusion of the second tubing string 204 in the system 100 may permit the segregation of the ammonium chloride and sodium hydroxide (or any other hydroxide-containing compound) of the endothermic fluid until the endothermic fluid composition 4 approaches or reaches the subsurface formation 201.

As previously stated, embodiments herein may be directed to thermally shocking a subsurface formation 201, such as by introducing the endothermic fluid composition 4. Accordingly, as shown in FIG. 1, the system 100 may further comprise one or more fluid injection pumps 208 configured to supply the endothermic fluid to the subsurface formation 201, such as through one or more injection lines 205 fluidly connected to the wellhead 210 and the one or more tubing strings 204. The endothermic fluid composition 4 may be supplied to the one or more fluid injection pumps 208 through one or more storage vessels, each storage vessel containing one of the components of the endothermic fluid composition 4, or multiple components of the endothermic fluid composition 4.

Moreover, the tubing string 204, wellhead 210, or both may comprise a one-way valve 207 disposed in the tubing string 204 or the wellhead 210 respectively for preventing backflow.

Figure 3:
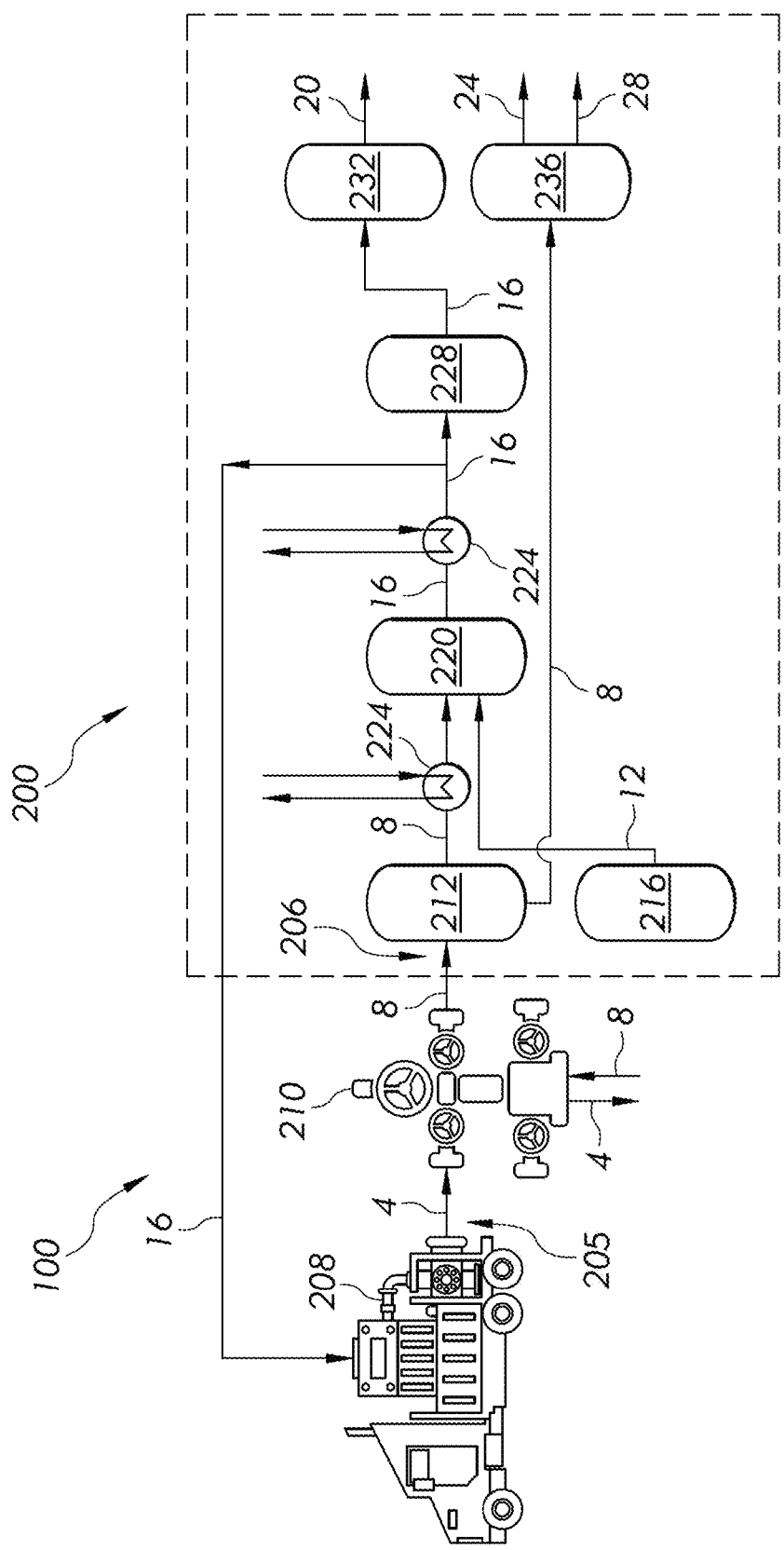
FIG. 3 illustrates another variation of the system for thermally shocking a subsurface formation and/or recovering ammonia gas from a subsurface formation, according to embodiments herein.

As previously stated, embodiments herein may also be directed to methods of recovering ammonia 8, such as ammonia gas, from the subsurface formation 201. Accordingly, as shown in FIG. 3, the system 100 may further comprise one or more return lines 206 coupled to the wellhead 210 and/or fluidly connected to the wellbore annulus for receiving return fluids from the wellbore 202, such as the ammonia 8. The one or more return lines 206 may be fluidly connected to one or more ammonia retention vessels 212 for storing the ammonia 8 and return fluids, as well as an ammonia recycling system 200 as described in further detail herein below.

Also as previously stated, embodiments herein may also be directed to methods of recycling the recovered ammonia 8 for reuse in the wellbore 202, or in other wellbores down the line. Recycling the ammonia 8 in such a manner may reduce the amount of fresh ammonium chloride that may be required to be provided to thermally shock the subsurface formation 201, which may be of some advantage in remote settings. Particularly, it is contemplated that ammonia gas may be regenerated into ammonium chloride by exposure to hydrochloric acid 12, such as according to Equation IV below:

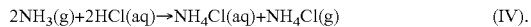

$$2NH_3(g)+2HCl(aq) \rightarrow NH_4Cl(aq)+NH_4Cl(g) \quad (IV).$$

Due at least to the exothermic nature of the above reaction, it is contemplated that at least some of the products of the reaction may be in the gaseous state, depending on the temperature of the reactants prior to the reaction, as explained in further detail hereinbelow. Moreover, it is contemplated that the above reaction with hydrochloric acid 12 may be of some advantage at least due to the common use of hydrochloric acid 12 in acidizing operations prior to hydraulic fracturing, such that hydrochloric acid 12 may already be readily available on-site.

Accordingly, to enable the recycling of the ammonia 8 into ammonium chloride, the system 100 may additionally comprise a hydrochloric acid storage vessel 216 comprising the hydrochloric acid 12, as shown in FIG. 1, as well as a mixing apparatus 220 fluidly connected downstream from the ammonia 8 retention vessel and the hydrochloric acid storage vessel 216. The mixing apparatus 220 may be configured to mix the ammonia 8 and the hydrochloric acid 12, thereby forming ammonium chloride.

While the ammonia 8 may be sent directly to the mixing apparatus 220, it is contemplated that there may be one or more intermediary separation units between the retention vessels and the mixing apparatus 220, such as one or more separators configured to remove subsurface formation 201 fluids that may be returned with the ammonia 8. Additionally or alternatively, the system 100 may comprise one or more coolant loops 224 may be interposed between the ammonia 8 retention vessel and the hydrochloric acid storage vessel 216, the one or more coolant loops 224 configured to cool the ammonia 8 and hydrochloric acid 12 prior to mixing in the mixing apparatus 220. Without being limited by theory, this may be of benefit in ensuring that the recycled ammonium chloride is formed primarily in the liquid phase in the mixing apparatus 220.

Additionally or alternatively, the system 100 may comprise one or more coolant loops 224 disposed downstream of the mixing apparatus 220, the one or more coolant loops 224 operable to cool the recycled ammonium chloride exiting the mixing apparatus 220. Also additionally or alternatively, the system 100 may comprise a condenser 228 fluidly connected downstream from the mixing apparatus 220, the condenser 228 configured to condense gaseous ammonium chloride in the recycled ammonium chloride stream 16.

Still referring to FIG. 1, the mixing apparatus 220, the condenser 228, or both may be fluidly connected upstream from the one or more storage vessels fluidly connected to the one or more injections lines 205, and particularly the one or more storage vessels responsible for storing the ammonium chloride for the endothermic fluid composition 4, which may be referred to as an "ammonium chloride storage vessel."

Additionally, in the event the ammonium chloride is to be stored in a solid state, the system 100 may further comprise a recrystallization unit 232 positioned downstream of the mixing apparatus 220, the condenser 228, or both. The recrystallization unit 232 may be configured to convert the recycled ammonium chloride stream 16 to a solid ammonium chloride product 20. The recrystallization unit 232 may also be positioned upstream of the one or more storage vessels responsible for storing the ammonium chloride, and may also be configured to send the solid ammonium chloride product 20 to the said one or more storage vessels.

Alternatively, in the event the ammonia gas is not desired to be recycled into ammonium chloride, the system 100 may further comprise a hydrocracker 236 fluidly connected downstream from the one or more ammonia retention vessels 212. The hydrocracker 236 may be configured to crack the ammonia 8 in the presence of a hydrocracking catalyst to produce hydrogen 24 and nitrogen 28. The hydrocracking catalyst may be any hydrocracking catalyst known in the art.

As previously stated, embodiments herein may be directed to methods of thermally shocking a subsurface formation 201, such as by utilizing any of the systems and endothermic fluid compositions hereinbefore discussed. The method may comprise introducing the endothermic fluid composition 4 into the wellbore 202; reacting the ammonium chloride and sodium hydroxide, thereby decreasing a temperature of the endothermic fluid and producing ammonia 8; and exposing the reacted endothermic fluid composition 4 to the subsurface formation 201, thereby thermally shocking at least a portion of the subsurface formation 201 and inducing one or more fractures in the same. In at least some embodiments, the ammonium chloride and the sodium hydroxide may be reacted prior to introduction into the wellbore 202. As shown in the examples herein, exposure of the reacted endothermic fluid composition 4 may reduce a compressive strength and a Poisson's ratio of the subsurface formation 201. Particularly, as shown in the Examples, the endothermic fluid composition 4 may reduce a compressive strength and/or Poisson's ratio of the subsurface formation 201 by at least 20 percent.

However, as previously stated, it may desired to delay the reaction between the ammonium chloride and the sodium hydroxide, such as until the endothermic fluid composition 4 approaches or is in contact with the subsurface formation 201. Accordingly, in at least some embodiments, the ammonium chloride may be encapsulated, such that the ammonium chloride and sodium hydroxide may be introduced together while still accomplishing the previous.

Alternatively, the ammonium chloride and the sodium hydroxide may be introduced separately, such that the endothermic fluid composition 4 may comprise a first sub-composition comprising the aqueous solution and the ammonium chloride, as well as a second sub-composition comprising the aqueous solution and the sodium hydroxide. In such embodiments of the method, the wellbore 202 may further comprise the first tubing string 204 and the second tubing string 204. Moreover, the method may comprise introducing the ammonium chloride into the wellbore 202 from the first tubing string 204 and introducing the sodium hydroxide from the second tubing string 204, or vice-versa.

As previously stated, the methods of thermally shocking the subsurface formation 201 may reduce the compressive strength and/or Poisson's ratio of the subsurface formation 201, which may aid in future hydraulic fracturing operations. Accordingly, in at least one embodiment, the method may further comprise introducing a hydraulic fracturing composition into the subsurface formation 201 after exposing the reacted endothermic fluid to the subsurface formation 201, thereby increasing a size of the one or more fractures in the subsurface formation 201. The method may also comprise introducing a proppant into the subsurface formation 201, thereby propping open at least a portion of the one or more fractures in the subsurface formation 201.

As previously stated, embodiments herein may also be directed to methods of recovering the ammonia 8 from an endothermic reaction in the subsurface formation 201. The methods of recovering the ammonia 8 may utilize any of the systems, methods, or endothermic fluid compositions previously discussed. For example, and in embodiments, the method may comprise introducing the endothermic fluid composition 4 into the wellbore 202; reacting the ammonium chloride and the hydroxide-containing component; and exposing the reacted endothermic fluid composition 4 to the subsurface formation 201.

The method may also comprise recovering the ammonia 8 up the wellbore annulus and through the one or more return lines 206 of the wellhead 210. Without being limited by theory, the ammonia 8 may be recovered through the wellbore annulus by utilizing a negative pressure differential between the surface and the wellbore 202/subsurface formation 201. Particularly, the endothermic fluid composition 4 may be introduced under pressure by the one or more fluid injection pumps 208, such that the wellbore 202 and the subsurface formation 201 may be at a greater pressure than the surface. Accordingly, opening the wellhead 210 to the one or more return lines 206 at or above atmospheric pressure may operate to 'flow back' at least a portion of the reacted endothermic fluid composition 4, and thereby the ammonia gas.

Alternatively, in the event the wellbore 202 does not comprise a tubing string 204, the ammonia 8 may be recovered by flowing back the wellbore 202 itself.

Moreover, the negative pressure differential may be increased by the addition of the packer assembly 203. Particularly, in embodiments of the method comprising the packer assembly 203, the method may further comprise prior to introducing the endothermic fluid composition 4 into the wellbore 202, actuating the packer assembly 203 positioned on the exterior of the tubing string 204, thereby forming a seal against a surface of the wellbore 202 and isolating the wellbore annulus from a surface of the wellbore 202 to the packer assembly 203. The method may also comprise, after exposing the reacted endothermic fluid composition 4 to the subsurface formation 201, de-actuating the packer assembly 203 to enable flowback of the ammonia 8 and endothermic fluid up the wellbore annulus. The method may also comprise circulating the ammonia 8 recovered through the wellbore annulus to an ammonia 8 retention vessel.

Finally, as previously stated, embodiments herein may also be directed to methods of utilizing the ammonia 8 recovered from the subsurface formation 201, such as by recycling the same or converting the same to hydrogen 24 gas. Particularly, in at least one embodiment, the method may comprise exposing the ammonia 8 to a hydrocracking catalyst in a hydrocracker 236, thereby producing hydrogen 24 gas and nitrogen 28. However, additionally or alternatively, the method may comprise introducing the ammonia 8 from the ammonia 8 retention vessel and hydrochloric acid 12 from a hydrochloric acid storage vessel 216 to a mixing apparatus 220; and mixing the ammonia 8 and hydrochloric acid 12, thereby forming a recycled ammonium chloride stream 16. The method may also comprise recycling the recycled ammonium chloride stream 16 to one or more fluid injection pumps 208 configured to introduce the endothermic fluid composition 4 into the wellbore 202 through one or more injection lines 205 of the wellhead 210.

Additionally or alternatively, the method may comprise exposing the ammonia 8 from the ammonia 8 retention vessel to one or more coolant loops 224 prior to introducing to the mixing apparatus 220; exposing the recycled ammonium chloride stream 16 to the one or more coolant loops 224; or both.

The method may also comprise introducing the recycled ammonium chloride stream 16 to a condenser 228, thereby condensing gaseous ammonium chloride in the recycled ammonium chloride stream 16 and/or introducing the recycled ammonium chloride stream 16 to a recrystallization unit 232, thereby forming a solid ammonium chloride product 20.

EXAMPLES

Various endothermic fluid compositions, along with comparative endothermic fluids, were tested to determine the suitability of the embodiments herein to thermally shock subsurface formations, as explained in further detail hereinbelow.

All experiments were performed using a beaker, a magnetic stirrer with a heating plate, and a temperature logger to measure and record the temperature in real-time. Reactants were separately poured into the beaker and mixed using the stirrer. As previously stated, the endothermic fluid, according to embodiments herein, as compared to other endothermic chemical compositions. The reactants, as well as the amounts used, are shown below in Table 1. Each composition was dissolved in 50 mL of water.

TABLE 1

Endothermic Fluid Composition vs. Comparative Examples

| Reaction Designation | Reactant One | Amount (grams) | Reactant Two | Amount (grams) | Temperature Drop ° C. | Time Delay to Room Temperature (minutes) |
|---|---|---|---|---|---|---|
| A | $NH_4Cl$ | 26.7 | NaOH | 2 | 18 | 25 |
| B | $NH_4Cl$ | 26.7 (mL) | — | (grams) | 12 | 21 |
| C | $CH_3COOH$ | 50 | $Na_2CO3$ | 5.3 | 1 | NA |
| D | $CH_3COOH$ | 50 | NaHCO3 | 4.2 | NA | NA |

Figure 2:
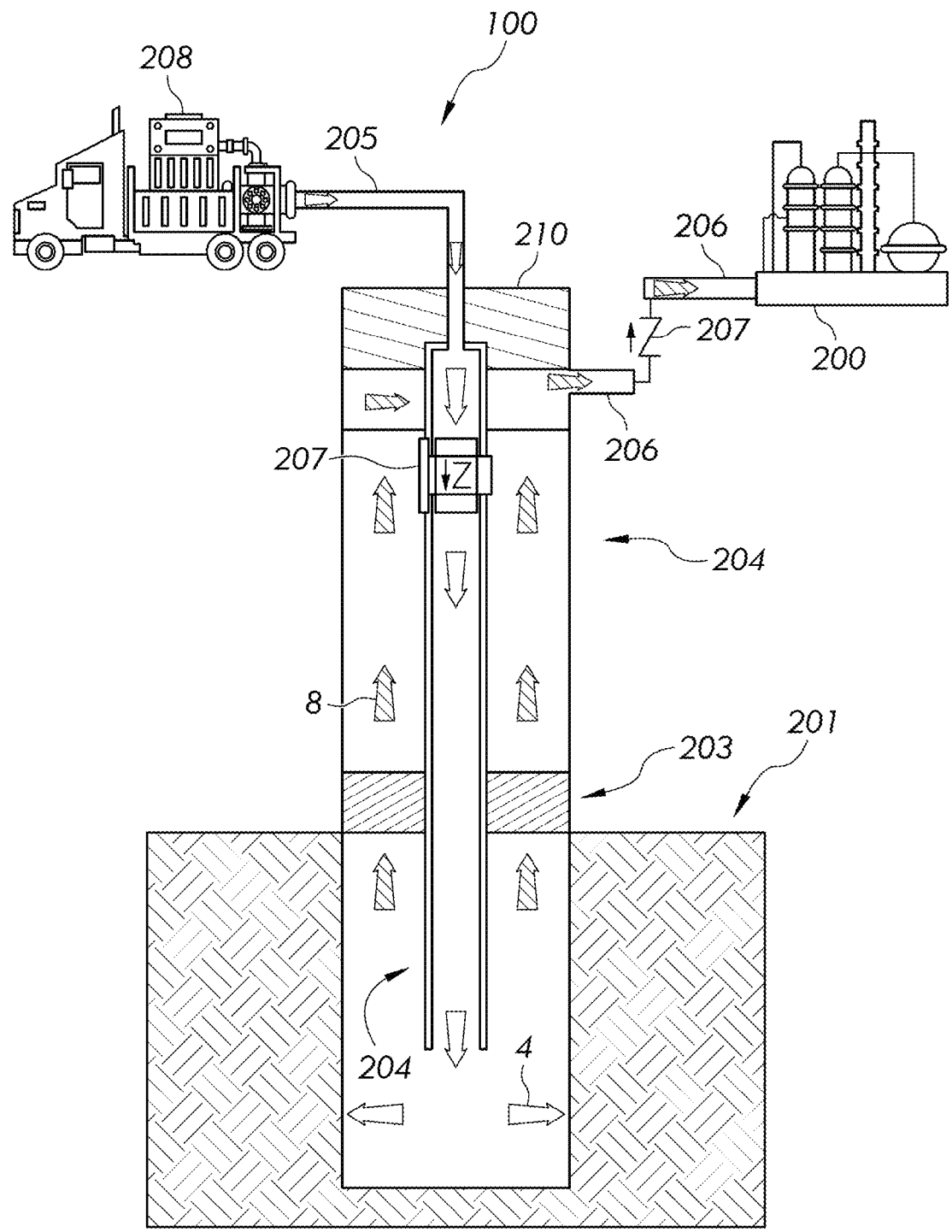
FIG. 2 illustrates a variation of the system for thermally shocking a subsurface formation and/or recovering ammonia gas from a subsurface formation, according to embodiments herein.

The temperature change for each of the examples is shown in FIG. 2. Particularly, FIG. 2 shows that Reaction A, the endothermic fluid composition, had the greatest initial temperature change, even considering that Reaction A had the greatest initial starting temperature. Reactions C and D had virtually no observable temperature drop. With regards to the time delay, Reaction A also had the greatest time delay. Accordingly, Reaction A, the endothermic fluid composition, was shortlisted as the optimal endothermic fluid composition.

To determine the impact reactant concentration had on the results of the endothermic fluid composition, reactant amounts were varied according to Table 2 below, the temperature change of which is shown in FIG. 3.

TABLE 2

Reactant Concentrations for FIG. 3

| Reaction Designation | Reactant One | Amount moles | Reactant Two | Amount moles | Amount Solvent mL | Molar Ratio R2 to R1 NA |
|---|---|---|---|---|---|---|
| A-1 | $NH_4Cl$ | 26.75 | NaOH | 2 | 50 | 2:1 |
| A-2 | $NH_4Cl$ | 26.75 | NaOH | 8 | 50 | 8 |
| A-3 | $NH_4Cl$ | 26.75 | NaOH | 12 | 50 | 12 |
| A-4 | $NH_4Cl$ | 53.49 | NaOH | 8 | 50 | 8 |
| A-5 | $NH_4Cl$ | 53.49 | NaOH | 16 | 100 | 8 |

As shown in FIG. 3, the endothermic reaction was shown to improve in line with increases in the molar ratio of sodium hydroxide with respect to ammonium chloride. However, unexpectedly, the reaction temperature decrease was negatively impacted by increased solvent (water) content while the time delay to room temperature improved, see A-2 vs. A-5. As previously shown in Table 1 and FIG. 2, the ammonium chloride is shown to react endothermically with water. Accordingly, it is contemplated that the reduced temperature decrease of A-5 may be due to more of the internal reaction equilibrium shifting towards the relatively less efficient water-ammonium chloride reaction than the ammonium chloride. The improved time delay to room temperature may simply be due to the increased total volume of fluid exhibiting correspondingly greater resistance to temperature increase. Accordingly, as thermal shock relies primarily on the magnitude of the temperature change, it may be desired to limit the water content in the endothermic fluid composition and maximize the molar ratio of sodium hydroxide to ammonium chloride, within economic and practical reason.

Figure 4:
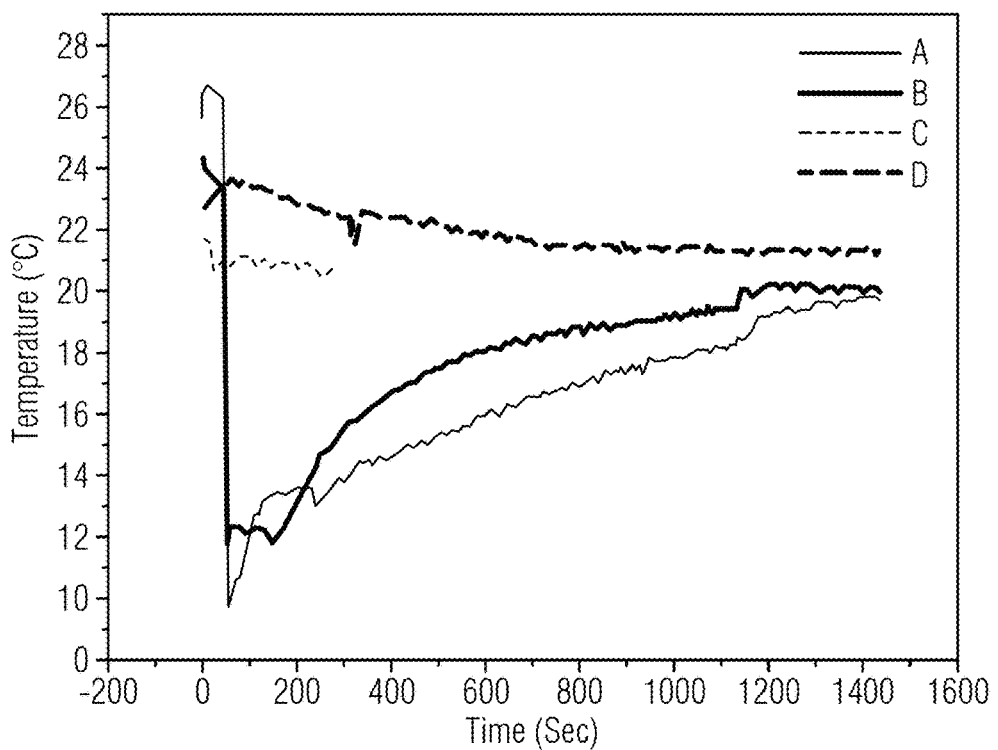
FIG. 4 illustrates the temperature alteration performance of the endothermic fluid composition, according to one or more embodiments herein, as compared to other endothermic fluid reactions.
Figure 5:
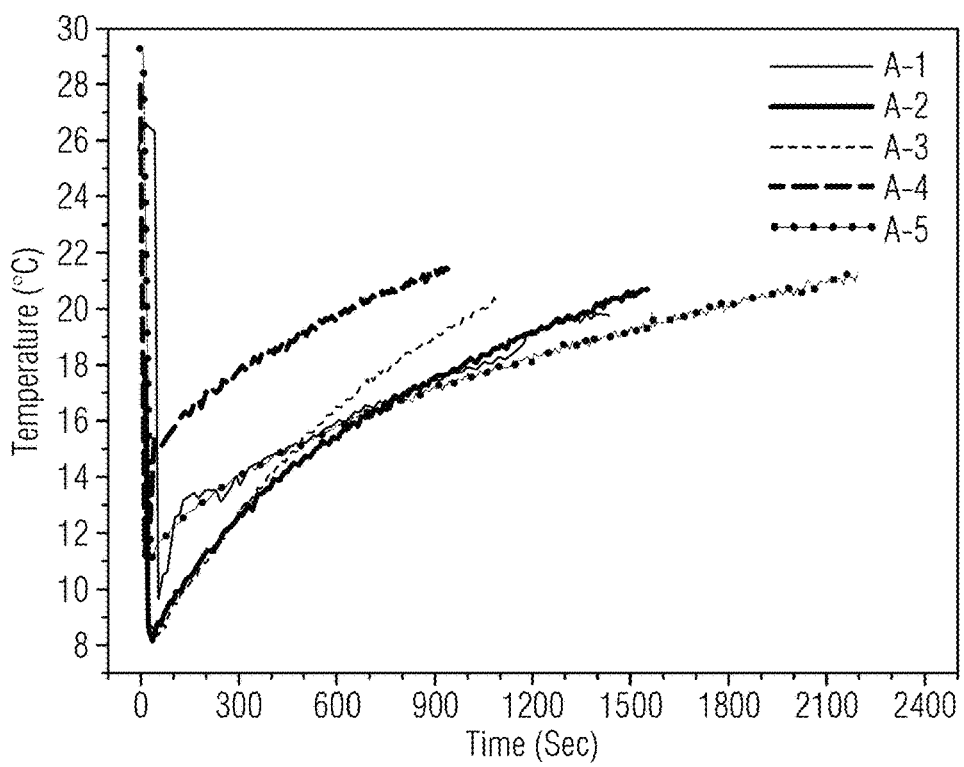
FIG. 5 illustrates the temperature alteration performance of the endothermic fluid composition at varying concentrations of the reactants, according to one or more embodiments herein.

To determine the impact the initial temperature has on endothermic reaction performance, the A-2 and A-5 were exposed to starting temperatures of 25° C., 40° C., 60° C., and 80° C., as shown in FIGS. 4 (A-2) and 5 (A-5). As shown in FIGS. 4 and 5, a starting temperature of 25° C. was shown to have the greatest time delay to recover to room temperature, indicating that cooling the endothermic fluid composition prior to introduction into the wellbore, such as at a temperature less than or equal to 25° C., may be desired should the ammonium chloride and sodium hydroxide be introduced together.

Figure 6:
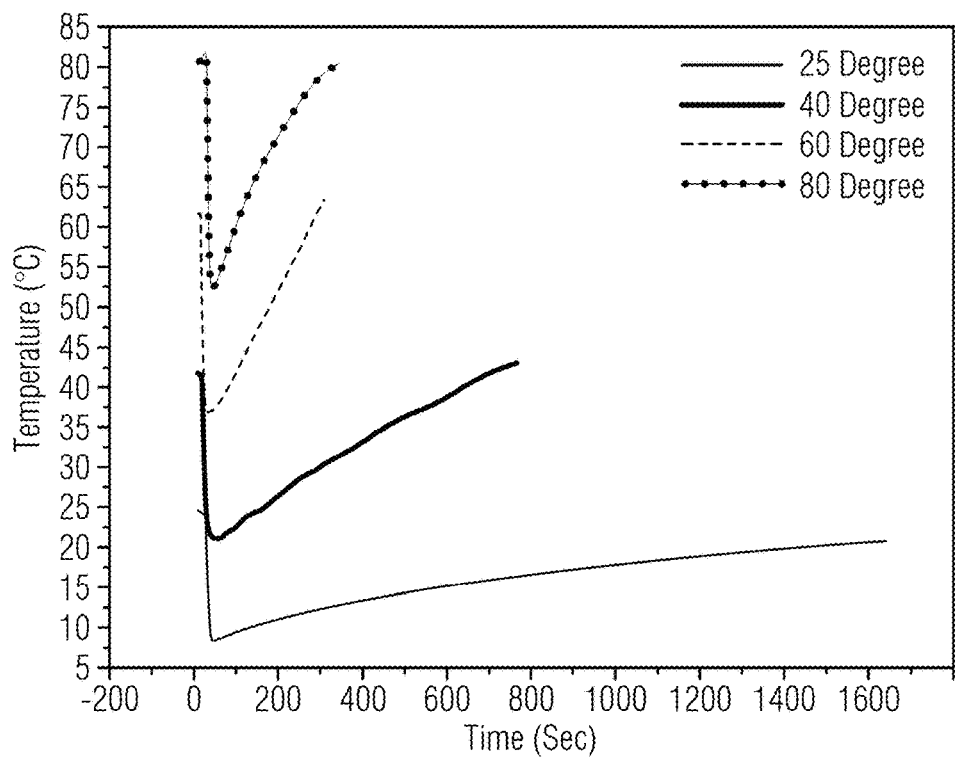
FIG. 6 illustrates the temperature alteration performance of one endothermic fluid composition at various starting temperatures, according to one or more embodiments herein.
Figure 7:
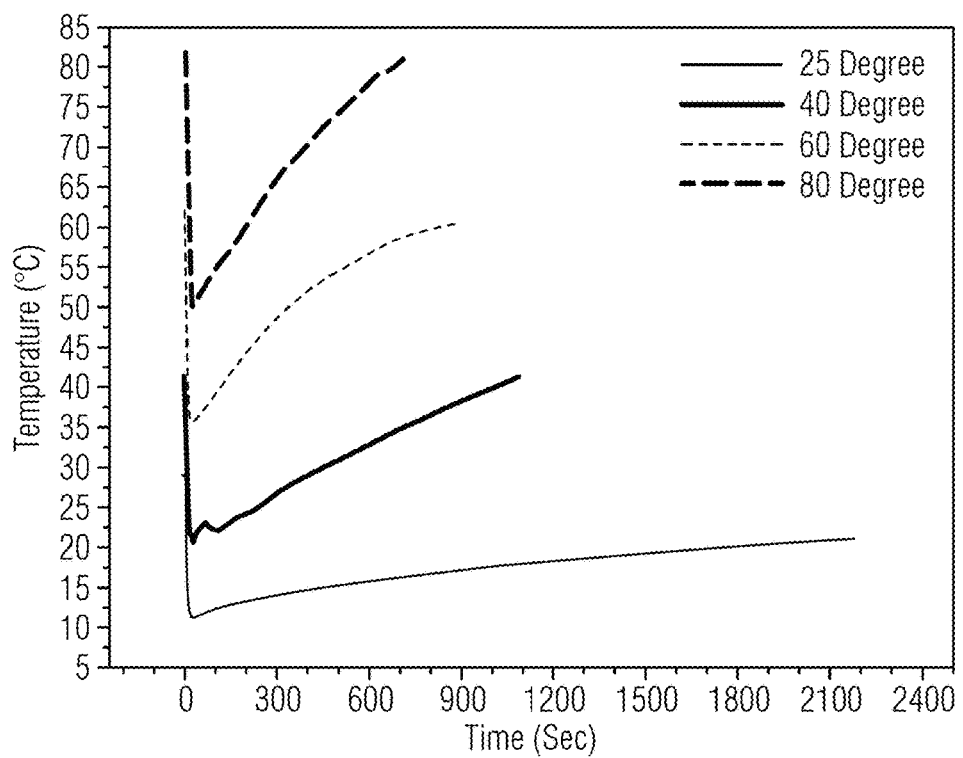
FIG. 7 illustrates the temperature alteration performance of another endothermic fluid composition at various starting temperatures, according to one or more embodiments herein.
Figure 8:
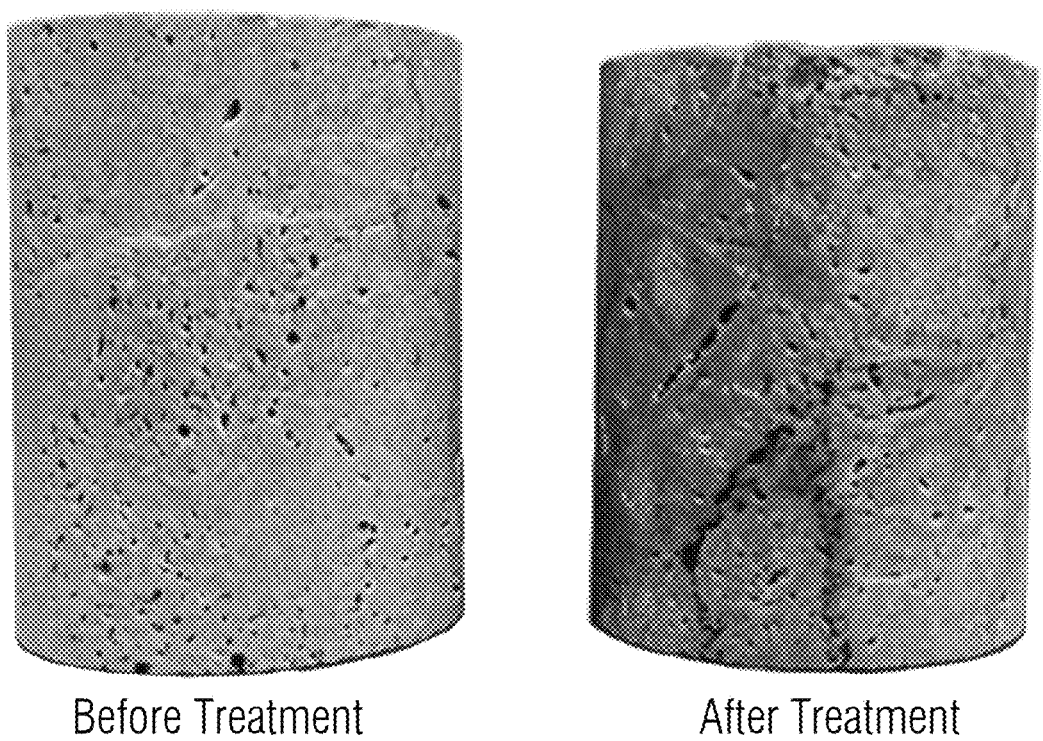
FIG. 8 illustrates a side view of a core sample before and after being exposed to the endothermic fluid composition, according to one or more embodiments herein.
Figure 9:
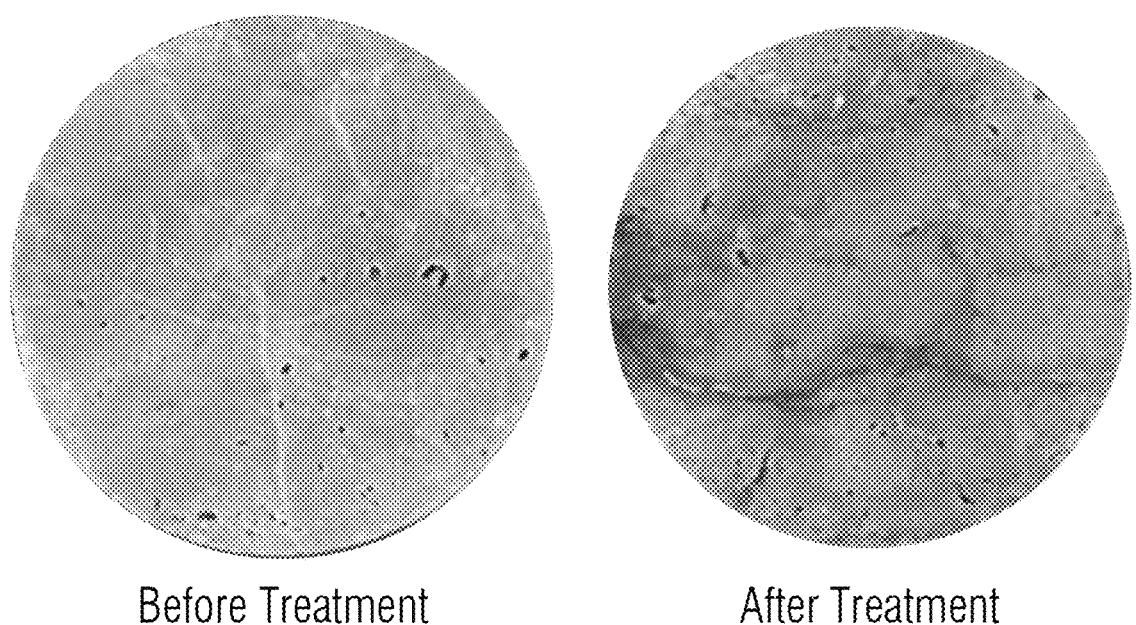
FIG. 9 illustrates a top view of the core sample of FIG. 8 before and after being exposed to the endothermic fluid composition, according to one or more embodiments herein.

Finally, to determine the impact of the endothermic fluid composition on a subsurface formation, A-5 was exposed to a core sample heated to 80° C. to simulate the subsurface formation. Before and after photographs of the core are shown in FIGS. 6 (side view) and 7 (top view). As is shown in by FIGS. 6 and 7, the core exhibits fracturing that was not observable before exposure to the endothermic fluid composition. The core was also subjected to a scratch test before and after exposure to the endothermic fluid to quantify the level of physical changes in the core. The results are shown in Table 3 below.

TABLE 3

Core Characteristics Before and After Thermal Shock

| | Compressive Strength (MPa) | Poisson's Ratio NA |
|---|---|---|
| Base Core | 112.16 | 0.2 |
| Shocked Core | 61.28 | 0.13 |
| % Change | 45.36 | 35 |

As shown in Table 3, the core experienced substantial reductions in compressive strength and Poisson's ratio after exposure to A-5, indicating suitability of the endothermic fluid composition for thermal shocking of a subsurface formation to lower breakdown pressure.

It is noted that recitations in the present disclosure of a component of the present disclosure being "operable" or "sufficient" in a particular way, to embody a particular property, or to function in a particular manner, are structural recitations, as opposed to recitations of intended use. More specifically, the references in the present disclosure to the manner in which a component is "operable" or "sufficient" denotes an existing physical condition of the component and, as such, is to be taken as a definite recitation of the structural characteristics of the component.

It is also noted that recitations herein of "at least one" component, element, etc., should not be used to create an inference that the alternative use of the articles "a" or "an" should be limited to a single component, element, etc. The singular forms "a," "an" and "the" include plural referents, unless the context clearly dictates otherwise.

Throughout this disclosure ranges are provided. It is envisioned that each discrete value encompassed by the ranges are also included. Additionally, the ranges which may be formed by each discrete value encompassed by the explicitly disclosed ranges are equally envisioned.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising." It is noted that the use of the terms "having" or "including", or grammatical variations thereof, in this disclosure should also be interpreted in like manner as the more commonly used open-ended preamble term "comprising".

As used in this disclosure, terms such as "first" and "second" are arbitrarily assigned and are merely intended to differentiate between two or more instances or components. It is to be understood that the words "first" and "second" serve no other purpose and are not part of the name or description of the component, nor do they necessarily define a relative location, position, or order of the component. Furthermore, it is to be understood that the mere use of the term "first" and "second" does not require that there be any "third" component, although that possibility is contemplated under the scope of the present disclosure.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

Having described the subject matter of the present embodiments herein in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present embodiments including, but not limited to, embodiments defined in the appended claims. More specifically, although some aspects of the present embodiments are identified herein as preferred or particularly advantageous, it is contemplated that the present embodiments is not necessarily limited to these aspects.

What is claimed is:

1. A method of thermally shocking a subsurface formation, the method comprising:
    introducing an aqueous solution, ammonium chloride, and sodium hydroxide into a wellbore fluidly connected to the subsurface formation;
    forming an endothermic fluid composition, wherein the endothermic fluid composition comprises an aqueous solution, ammonium chloride, and sodium hydroxide, wherein:
        a concentration of the ammonium chloride in the endothermic fluid composition is from 0.1 Molar to 5 Molar, and
        a concentration of the sodium hydroxide in the endothermic fluid composition is from 0.1 Molar to 32 Molar;
    reacting the ammonium chloride and sodium hydroxide, thereby decreasing a temperature of the endothermic fluid and producing ammonia; and
    exposing the reacted endothermic fluid composition to the subsurface formation, thereby thermally shocking at least a portion of the subsurface formation and inducing one or more fractures in the same.

2. The method of claim 1, wherein a molar ratio between the sodium hydroxide and the ammonium chloride is from 1:1 to 15:1 sodium hydroxide to ammonium chloride.

3. The method of claim 1, wherein the ammonium chloride and the sodium hydroxide are reacted prior to introduction into the wellbore.

4. The method of claim 1, wherein:
    the ammonium chloride and sodium hydroxide are introduced together into the wellbore; and
    the ammonium chloride is encapsulated, such that the reaction between the ammonium chloride and the sodium hydroxide is at least partially delayed.

5. The method of claim 1, wherein the step of introducing an aqueous solution, ammonium chloride, and sodium hydroxide comprises:
    the ammonium chloride being introduced into the wellbore from a first tubing string;
    the sodium hydroxide being introduced into the wellbore from a second tubing string; and
    the first and second tubing strings extending from a surface of the wellbore to a location within the wellbore proximal the subsurface formation.

6. The method of claim 5, wherein the second tubing string is disposed concentrically within the first tubing string.

7. The method of claim 6, wherein the first tubing string further comprises a packer assembly positioned on the exterior of the first tubing string, the packer assembly configured to form a seal against the wellbore when actuated, thereby isolating the wellbore annulus from a surface of the wellbore to the packer assembly.

8. The method of claim 5, wherein the second tubing string is disposed alongside the first tubing string, such that an exterior of the first tubing string, an exterior of the second tubing string, and the wellbore together define a wellbore annulus.

9. The method of claim 5, wherein the first tubing string and the second tubing string together further comprise a packer assembly positioned on the exterior of the first tubing string and the second tubing string, the packer assembly configured to form a seal against the wellbore when actuated, thereby isolating the wellbore annulus from a surface of the wellbore to the packer assembly.

10. The method of claim 1, wherein exposing the reacted endothermic fluid composition to the subsurface formation reduces a compressive strength of the subsurface formation by at least 20 percent.

11. The method of claim 1, wherein exposing the reacted endothermic fluid composition to the subsurface formation reduces a Poisson's ratio of the subsurface formation by at least 20 percent.

12. The method of claim 1, further comprising introducing a hydraulic fracturing composition into the subsurface formation after exposing the reacted endothermic fluid to the subsurface formation, thereby increasing a size of the one or more fractures in the subsurface formation.

13. The method of claim 12, further comprising introducing a proppant into the subsurface formation, thereby propping open at least a portion of the one or more fractures in the subsurface formation.

14. The method of claim 1, wherein the subsurface formation is an unconventional reservoir.

15. The method of claim 1, wherein the subsurface formation is a shale.

* * * * *